United States Patent Office 2,858,321
Patented Oct. 28, 1958

2,858,321
METHYLENE-HYDROPHENANTHRENES AND PROCESS FOR THEIR MANUFACTURE

Leopold Ruzicka, Zurich, Hans Heusser, Kreuzlingen, and Rudolf Anliker, Zurich, Switzerland, assignors to Ciba Pharmaceutical Products Inc., Summit, N. J.

No Drawing. Application October 10, 1956
Serial No. 615,030

Claims priority, application Switzerland October 13, 1955

12 Claims. (Cl. 260—340.9)

This invention relates to a new series of organic compounds. More particularly it concerns a new group of 2-methylene hydrophenanthrenes represented by compounds of the formula

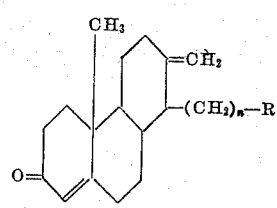

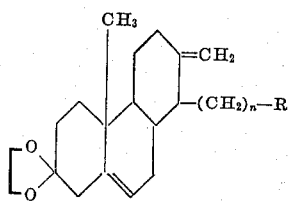

and

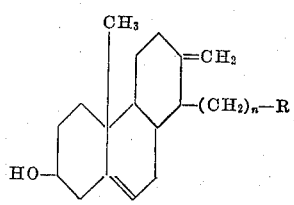

in which formulae R is a carboxyl group, an esterified carboxyl group, a nitrile group or an acetyl group and $n$ is a whole number from 2 to 3.

These 2-methylene-hydrophenthrenes are valuable as intermediate products for the production of steroid compounds oxygenated in the 18-position, and especially for the production of the highly active suprarenal cortex hormone, aldosterone.

The conversion of the compounds of the formulae given above into 18-oxygenated steroids, and in particular into aldosterone can be carried out in the following manner:

The compounds in which R is a carboxyl, an esterified carboxyl or a nitrile group may be first converted by the methods described below into the methylketone of the partial formula

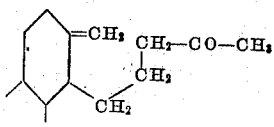

By epoxylating the exo-cyclic double bond and splitting up the resulting epoxide with a hydrohalic acid there is obtained a halogen hydrin of the partial formula

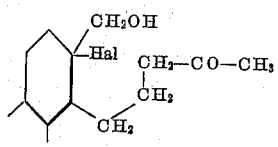

which, if desired, before or after oxidation of the oxymethyl group to the carboxy group followed by esterification, may be subjected to ring closure by intramolecular alkylation to form an 18-oxygenated steroid. A hydroxyl group can then be introduced into the 11-position of the steroids thus obtained by a microbiological method and such hydroxyl group may be lactonized with the carboxyl group in 18-position. There can be obtained in this manner, for example, the (18→11β)-lastone of Δ⁴-3,20-dioxo-11β-hydroxy-pregnene-18-acid, which is a known intermediate product for the synthesis of aldosterone [cf. Experientia, volume 11, page 363 (1955)]. Depending on the starting material chosen related (18→11β)-lactones of the pregnene series may similarly be obtained which may in turn be converted into aldosterone.

The products of the present invention may be prepared by a process wherein a 2-methyl-hydrophenanthrene, which contains in the 2-position a free or substituted hydroxyl or amino group and in the 1-position the residue-$(CH_2)_n$—R in which $n$ is a whole number from 2 to 3 and R represents a carboxyl group, an esterified carboxyl group, a nitrile group or an acetyl group, is subjected to the action of an agent capable of splitting off the said group in 2-position with the formation of an exo-cyclic double bond. If desired, the substituent in the 1-position of the resulting compounds may be extended by 1 or 2 carbon atoms.

A 2-methyl-hydrophenanthrene-2-ol, advantageously after being converted into a sulphonic acid ester, for example, a methane or paratoluene sulphonic acid ester, may be treated with a basic compound, such as a tertiary amine, for example, collidine, pyridine or triethylamine, or may be dehydrated by the action of an inorganic acid chloride, such as phosphorus oxychloride or thionyl chloride, more especially in the presence of pyridine. The splitting takes an especially unitary course in the case of amines, especially quaternary ammonium bases, under the action of an alkali, for example, an alkali hydroxide, and/or at a raised temperature.

As starting materials there are used more especially compounds of the formulae

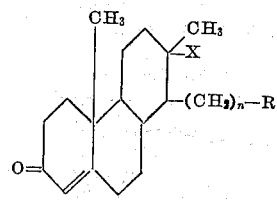

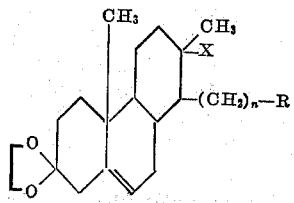

or

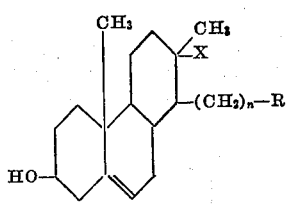

in which n is a whole number from 2 to 3, R is a carboxyl group, an esterified carboxyl group, an acetyl or a nitrile group, and X is a free or substituted hydroxyl or amino group.

The starting materials can be made by known methods. Particularly suitable methods comprise peracid oxidation or Beckmann rearrangement of oximes of 17-oxo-steroids or 17a-oxo-D-homo-steroids. From the oximes of 17-oxo-steroids or 17a-oxo-D-homo-steroids there are obtained, for example, lactams of the Formula II or VII, which can be subjected to further conversion in accordance with the following scheme:

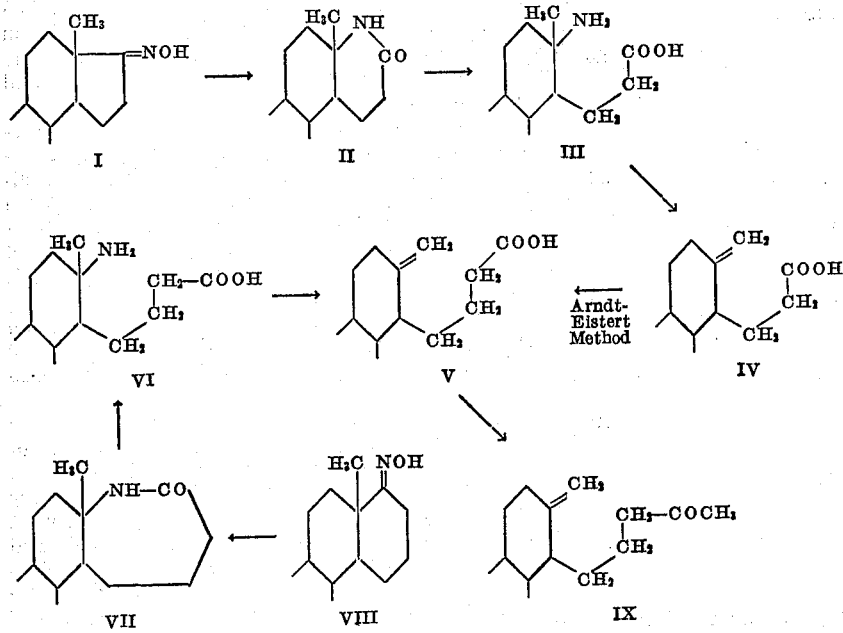

The extension of the side chain at the 1-carbon atom, for example, by the method of Arndt and Eistert, and also the rearrangements in the ring A, may be carried out either before or after the introduction of the methylene, double bond. Thus, for example, a $\Delta^{8a}$-7-oxy-grouping may be converted into a $\Delta^{8}$-7-oxo-grouping and/or the latter may be converted into a $\Delta^{8a}$-7-ethylene-dioxy-derivative.

The extension of the side chain by one carbon atom can also be carried out by reducing the carboxyl group of the substituent in 1-position to the carbinol group, for example with the aid of lithium aluminium hydride, and reacting an active ester of the carbinol, such as a halide or tosylate, with potassium cyanide.

From the Compound V there is obtained by way of the corresponding acid chloride and by reaction with cadmium dimethyl or lithium methyl, the methyl ketone IX, which is especially suitable for the production of 18-oxygenated steroids. From the nitriles of the Compounds VI and V there can likewise be obtained a methyl ketone of the Formula IX by reaction with a methyl-magnesium halide.

The following examples illustrate the invention:

Example 1

400 milligrams of $\Delta^{8a}$-1β-(β'-carboxyethyl)-2α-amino-2β,4β-dimethyl-1,2,3,4,4aα,4b,5,6,7,8,10aβ - dodecahydrophenanthrene-7β-ol are dissolved in 10 cc. of methanol, and neutralised by the addition of the calculated quantity of a methanolic solution of caustic potash. The solvent is evaporated in vacuo and the potassium salt is well dried in a high vacuum. The potassium salt dissolved in 10 cc. of absolute methanol is mixed with 50 grams of methyl iodide, and the mixture is heated for 3 days under reflux. During this period the pH value is continually checked and maintained above 7 by small additions of 0.5 N-methanolic caustic potash (a total of 10 cc.). At the end of the reaction the now weakly acid solution is evaporated to dryness in vacuo. The yellow oily residue is taken up in chloroform and the solution is filtered to remove undissolved potassium iodide.

The crude quaternary ammonium iodide (655 milligrams) is dissolved in 10 cc. of ethylene glycol and 5 cc. of water and, after the addition of 2.5 grams of potassium hydroxide, the mixture is heated for 5 hours under nitrogen at 150–170° C. The onset of the reaction can be recognised by the evolution of trimethylamine. The cold solution is then worked up by extraction with chloroform. From the acid portions there are obtained 191 milligrams of crystalline $\Delta^{8a}$-1β-(β'-carboxyethyl)-2-methylene-4β-methyl - 1,2,3,4,4aα,4b,5,6,7,8,10,10aβ-dodecahydrophenanthrene-7β-ol melting at 184–185° C. The compound crystallises from a mixture of methylene chloride and acetone, and has the specific rotation $[\alpha]_D^{20} = -83°$ (c.=0.829 in ethanol). Its infrared absorption spectrum in nujol shows bands at 3300 cm.$^{-1}$ (>CH—OH), 1692 cm.$^{-1}$ (carboxyl) and at 1648 cm.$^{-1}$ and 895 cm.$^{-1}$ (>C=CH$_2$).

The $\Delta^{8a}$-1β-(β'-carboxyethyl)-2-methylene-4β-methyl-1,2,3,4,4aα,4b,5,6,7,8,10,10aβ - dodecahydrophenanthrene-7β-ol may be esterified, for example as follows:

200 milligrams of "methylene acid" are allowed to stand in a mixture of 16 cc. of methanol and 4 cc. of 1 N-hydrochloric acid for 3 days at room temperature. The neutral portions (190 milligrams) obtained by working up yield on recrystallisation from petroleum ether clusters of crystals of the methyl ester melting at 76–77° C., and having the specific rotation $[\alpha]_D^{20} = -85°$ (c.=0.80 in chloroform).

By hydrolysis of this ester with a methanolic solution of caustic potash of 4 percent strength there can be regenerated in quantitative yield the methylene-acid melting at 185° C.

Dehydrogenation of the hydroxyl group in the 7β-position to the oxo group accompanied by the simultaneous transposition of the double bond from the 8a:9-position to the 8,8a-position may be carried out, for example, as follows: 1.87 grams of Δ$^{8a}$-1β-(β'-carbomethoxyethyl)-2-methylene-4bβ-methyl-1,2,3,4,4aα,4b,5,6,7,8,10,10aβ-dodecahydrophenanthrene-7β-ol are dissolved in 100 cc. of absolute toluene and 25 cc. of freshly distilled cyclohexanone, and, after the addition of 1 gram of aluminium tertiary butylate, the mixture is boiled for one hour under reflux. The reaction mixture is then poured into ice water, acidified with 2 N-hydrochloric acid, and extracted with chloroform. The crude product is subjected to steam distillation and then purified by chromatography over 60 grams of aluminium oxide (activity III). The petroleum ether-benzene-1:1-fractions yield Δ$^8$-1β-(β'-carbomethoxyethyl)-2-methylene-4bβ-methyl-1,2,3,4,4aα,4b,5,6,7,9,10,10aβ-dodecahydrophenanthrene-7-one, which exhibits in the ultraviolet absorption spectrum a maximum at 240 mμ (log ε=4.2). The carbomethoxy group in the resulting keto-ester may be hydrolysed as follows:

30 cc. of an aqueous solution of potassium carbonate of 10 percent strength are added to a hot solution of 1.5 grams of the crude keto-ester in 40 cc. of methanol, and the mixture is heated for 30 minutes under reflux in nitrogen. Separation into acid and neutral portions yields 1.34 grams of Δ$^8$-1β-(β'-carboxyethyl)-2-methylene-4bβ-methyl-1,2,3,4,4aα,4b,5,6,7,9,10,10aβ-dodecahydrophenanthrene-7-one melting at 158° C. After recrystallising the product from a mixture of acetone and isopropyl ether, the prisms so obtained melt at 166° C. Its ultra-violet absorption maximum in rectified spirit is at 242 mμ (log ε=4.26).

The 1β-side chain may be built up, for example, as follows:

400 milligrams of Δ$^8$-1β-(β'-carboxyethyl)-2-methylene-4bβ-methyl-1,2,3,4,4aα,4b,5,6,7,9,10,10aβ-dodecahydrophenanthrene-7-one melting at 166° C. are suspended in 10 cc. of absolute benzene, and mixed at 5° C. with 2 cc. of oxalyl chloride in 5 cc. of benzene. The suspension is allowed to stand, while frequently rotating it, for one hour at 10° C., the crystals dissolving with the evolution of gas. The light yellow solution is then evaporated in vacuo at 15° C., the residue is dissolved in 4 cc. of absolute benzene, and the solution is introduced dropwise at 0° C. into 30 cc. of an ethereal solution of diazomethane of 4 percent strength. The mixture is allowed to stand for 2 hours at 0° C. By evaporation in vacuo there are obtained 430 milligrams of crude diazo-ketone, which is purified by dissolution in a small amount of benzene and filtration through aluminium oxide. The diazoketone is dissolved in 30 cc. of absolute methanol and a suspension of freshly prepared silver oxide (from 10 cc. of an 0.1 N-solution of silver nitrate) in methanol is added. The reaction mixture is heated with the exclusion of moisture for 2 hours under reflux, and is then treated with active charcoal. After filtering and evaporating the solution, 420 milligrams of a colourless amorphous residue remain behind, which possess the following physical properties:

U. V. λ max.=242 mμ (log ε=4.17), IR-bands at 896; 1647 cm.$^{-1}$ (>=CH$_2$); 1622 and 1676 cm.$^{-1}$ (α,β-unsaturated ketone); and 1737 cm.$^{-1}$ (ester). The reaction product so obtained is Δ$^8$-1β-(γ'-carbomethoxypropyl)-2-methylene-4bβ-methyl-1,2,3,4,4aα,4b,5,6,7,9,10,10aβ-dodecahydrophenanthrene-7-one.

156 milligrams of Δ$^8$-1β-(γ'-carbomethoxypropyl)-2-methylene-4bβ-methyl-1,2,3,4,4aα,4b,5,6,7,9,10,10aβ-dodecahydrophenanthrene-7-one are dissolved in 4 cc. of methanol and, after the addition of 3 cc. of an aqueous solution of potassium carbonate of 10 percent strength, the mixture is boiled under reflux for ½ hour. The free acid so obtained, after being dried in a high vacuum, is taken up in 10 cc. of absolute benzene and mixed at 0° C. with a solution of 2 cc. of oxalyl chloride in 5 cc. of benzene. The mixture is allowed to stand at 0° C. for one hour, and is then evaporated to dryness in vacuo. The acid chloride so obtained is dissolved in 20 cc. of absolute benzene, and is introduced dropwise, while stirring, at 40° C. into 30 cc. of an ethereal solution of cadmium dimethyl (prepared from 2.3 grams of magnesium, 30 cc. of ether, 20 grams of methyl bromide and 12 grams of cadmium chloride). The reaction mixture is heated at the boil under reflux for 2 hours in nitrogen. The solution is then poured on to ice, acidified with 2 N-sulphuric acid and extracted by agitation with ether. The neutral portions (110 milligrams) exhibit in the ultraviolet absorption spectrum a maximum at 242 mμ (log ε=4.15). In the infra-red absorption spectrum it exhibits the following bands: at 895 and 1649 cm.$^{-1}$ (>=CH$_2$); at 1625 and 1681 cm.$^{-1}$ (α,β-unsaturated ketone); and at 1715, 1220 and 1170 cm.$^{-1}$

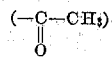

This compound is Δ$^8$-1β-(γ'-acetylpropyl)-2-methylene-4bβ-methyl-1,2,3,4,4aα,4b,5,6,7,9,10,10aβ-dodecahydrophenanthrene-7-one.

Example 2

In a flask provided with a vibromixer and a reflux condenser 1.11 grams of the sodium salt of Δ$^{8a}$-1β-(γ'-carboxypropyl)-2α-amino-2β,4bβ-dimethyl-7,7-ethylenedioxy-1,2,3,4,4aα,4b,5,6,7,8,10,10aβ-dodecahydrophenanthrene are dissolved in 50 cc. of absolute methanol, and boiled with 7 grams of anhydrous potassium carbonate and 100 grams of methyl iodide for 70 hours with the exclusion of moisture. The solvent is then removed at room temperature in vacuo. The white crystalline residue is dissolved in a mixture of 20 cc. of ethylene glycol and 10 cc. of water, and, after the addition of 5 grams of potassium hydroxide, the mixture is slowly heated to 150° C. in an open flask, whereupon trimethylamine and water are evolved. After ½ hour a reflux condenser is fitted to the flask and the bath temperature is maintained at 150–170° C. for a further 4 hours while introducing nitrogen. The solution is then poured on to ice, the neutral portions are separated by means of chloroform, and the aqueous phase is extracted with chloroform after the addition of 2 N-phosphoric acid to give a pH value of 7–8. The extract is washed until neutral, and after evaporation it leaves behind 578 milligrams of a crystalline product. The pure Δ$^{8a}$-1β-(γ'-carboxypropyl)-2-methylene-4bβ-methyl-7,7-ethylenedioxy-1,2,3,4,4aα,4b,5,6,7,8,10,10aβ-dodecahydrophenanthrene crystallises from a mixture of acetone and isopropyl ether in the form of needles melting at 148–149° C. and has the specific rotation [α]$_D^{20}$=−45° (c.=0.935 in ethanol).

The resulting ketal-acid can be converted in the following manner into the Δ$^8$-1β-(γ'-carboxypropyl)-2-methylene-1,2,3,4,4aα,4b,5,6,7,9,10,10aβ-dodecahydrophenanthrene-7-one which is described in Example 1:

500 milligrams of the ketal-acid melting at 148–149° C. are dissolved in 10 cc. of tetrahydrofurane, and then mixed with 5 cc. of 3 N-perchloric acid and the whole is maintained at room temperature for 4 hours. By diluting the mixture with water and extracting it with ether, there is obtained Δ$^8$-1β-(γ'-carboxypropyl)-2-methylene-1,2,3,4,4aα,4b,5,6,7,9,10,10aβ-dodecahydrophenanthrene-7-one, which is identical in every respect with the compound described in Example 1. It has the following properties: U. V.:λ max.=242 mμ (log ε=4.17); IR-bands at 896 and 1647 cm.$^{-1}$ (>C=CH$_2$); 1622 and 1676 cm.$^{-1}$ (α,β-unsaturated ketone) and 1737 cm.$^{-1}$ (ester band).

The starting material used in this example may be prepared as follows:

1.63 grams of Δ⁵-3β-acetoxy-17a-oxo-D-homo-androstene are introduced into a concentrated solution of hydroxylamine acetate in ethanol. By the further addition of ethanol at a raised temperature a clear solution is obtained, which is heated for 4 hours under reflux. About half of the solvent is evaporated and the oxime is precipitated by the addition of hot water. The crystalline precipitate is washed on the suction filter with water. The oxime (1.28 grams) crystallises from methanol in well formed prisms melting at 211–213° C., and has the specific rotation [α]$_D^{20}$=—213° (c.=1.045 in chloroform).

4 grams of the oxime are dissolved in 40 cc. of absolute collidine-free pyridine by gentle warming and then mixed with 2 grams of para-acetamino-benzene sulphochloride. The dark coloured solution is allowed to stand for 2 days at room temperature with the exclusion of moisture. The reaction solution is poured into 5 times its weight of ice water, the mixture is maintained for 2 days longer at 20° C., then acidified with dilute sulphuric acid (1:1), and worked up by extraction with chloroform. The yellow crude product is decolorised to a considerable extent by means of active charcoal and is recrystallised from a mixture of methanol and water. There are obtained in the form of lustrous scales three grams of a mixture of 2 isomeric lactams which melts at 224–225° C. after recrystallization three times, and has the specific rotation [α]$_D^{22}$=—178° (c.=0.957 in chloroform). The pure lactam of Δ⁸ᵃ-1β-(γ'-carboxypropyl)-2-α-amino-2β,4bβ-dimethyl - 1,2,3,4,4aα,4b,5,6,-7,8,10,10aβ-dodecahydrophenanthrene-7β-ol, which can easily be obtained by alkaline hydrolysis of the lactam mixture, separation of the hydrolysate into neutral and acid portions, and thermal rearrangement of the ring of the acid portion, melts at 261° C., and has the specific rotation [α]$_D$=—156°. IR-bands at 3250 and 3190 cm.⁻¹ (—OH, >NH); and at 1632 cm.⁻¹ (lactam).

6.53 grams of the lactam of Δ⁸ᵃ-1β-(γ'-carboxypropyl)-2α-amino - 2β,4bβ - dimethyl-1,2,3,4,4b,5,6,7,8,10,10aβ-dodecahydrophenanthrene-7β-ol are dissolved in 300 cc. of absolute benzene and 250 cc. of absolute acetone at a raised temperature, and, after the addition of 35 grams of aluminium tertiary butylate, the mixture is boiled under reflux for 22 hours with the exclusion of moisture. The reaction mixture is poured into ice water and acidified with 2 N-sulphuric acid. The aqueous layer is extracted with chloroform. The combined organic phases are washed neutral with water, dried and evaporated. The crystalline residue is adsorbed on 200 grams of aluminium oxide (activity II). The benzene fraction and the benzene-ether (1:1)-fractions yield the lactam of Δ⁸-1β-(γ'-carboxypropyl) - 2α-amino-2β,4bβ-dimethyl-1,2,3,4,-4aα,4b,5,6,7,9,10,10aβ - dodecahydrophenanthrene-7-one, which melts at 266–267° C. after recrystallisation from acetone and sublimation at 180° C. in a high vacuum. It has the specific rotation [α]$_D^{20}$=—3° (c.=1.044 in chloroform).

From a solution of 1.4 grams of the keto-lactam melting at 266–267° C. in 40 cc. of absolute benzene and 2 cc. of dry ethylene glycol the last traces of water are removed by evaporating some of the benzene. After the addition of 15 milligrams of para-toluene sulphonic acid monohydrate, the reaction mixture is boiled under reflux for 16 hours while the water formed is separated. The solution is then rendered alkaline with a saturated solution of sodium hydrogen carbonate and is worked up by extraction with benzene. The crude colourless product crystallises from a mixture of methanol and isopropyl ether in needles (1.25 grams). After being recrystallised three times the pure lactam of Δ⁸ᵃ-1β-(γ'-carboxypropyl)-2α-amino-2β,4bβ - dimethyl - 7,7 - ethylenedioxy-1,2,3,4,4aα,4b,5,6,7,8,10,10aβ - dodecahydrophenanthrene melts at 266° C., and has the specific rotation [α]$_D^{20}$=—93° (c.=0.996 in chloroform). It exhibits no absorption in the ultraviolet spectrum.

1.64 grams of the ethylene-ketal-lactam melting at 266° C. are heated under reflux for 4 hours in nitrogen in 40 cc. of a butanolic solution of caustic soda of 18 percent strength, after the addition of 2 cc. of water. Neutral portions are removed from the cold reaction mixture by means of ether and chloroform. The pH value of the aqueous solution cooled with ice is adjusted to 9 with 1 N-hydrochloric acid and thorough intermixing. The solution is concentrated to 150 cc. in a vacuum produced by a water jet pump, whereby a thick crystalline mass separates out. The crystallisate is filtered off with suction and dissolved in 150 cc. of an 0.05 N-solution of caustic soda. After filtering the mixture, the clear solution is concentrated to 60 cc., the sodium salt of Δ⁸ᵃ-1β-(γ'-carboxypropyl) - 2α - amino - 2β,4aβ - dimethyl - 7,7-ethylene-dioxy-1,2,3,4,4aα,4b,5,6,7,8,10,10aβ - dodecahydrophenanthrene is precipitated by the addition of sodium chloride, and crystallisation is completed by allowing the mixture to stand in a cooling cabinet. For the purpose of purification the sodium salt is taken up in methanol, undissolved constituents are filtered off, the filtrate is evaporated to dryness, and there are obtained 1.33 grams of the sodium salt melting at 328–330° C., and having the specific rotation [α]$_D^{20}$=—13° C. (c.=0.921 in an 0.1 N-solution of sodium hydroxide).

*Example 3*

The Δ⁸-1β-(γ'-acetyl-propyl)-2-methylene-4bβ - methyl-1,2,3,4,4aα,4b,5,6,7,9,10,10aβ - dodecahydrophenanthrene-7-one described in Example 1 may be used as follows for the synthesis of aldosterone:

600 mg. of the methylene compound are dissolved in 35 cc. of absolute ether and mixed at 0° C. with 20 cc. of an ethereal solution of monoper-phthalic acid (containing 7.12 mg. of active oxygen per cc.). The reaction mixture is maintained at 0° C. for 24 hours and then allowed to stand in the dark for 48 hours at 20° C. The product is then worked up by agitating the ethereal solution with aqueous sodium bicarbonate and water. The resulting crude product is purified by chromatography, the oxide so obtained exhibits in the ultraviolet spectrum a maximum at 242 mμ (log ε=4.17). In the infra-red spectrum it exhibits bands at 1622 and 1676 cm.⁻¹ (α,β-unsaturated ketone) and at 1715, 1220 and 1170 cm.⁻¹

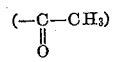

500 milligrams of the crude oxide are dissolved in 100 cc. of ethanol and mixed with 100 mg. of ferric chloride in 5 cc. of water. The reaction mixture is allowed to stand for 2 hours at 20° C. and then heated for one hour at 60° C. By diluting the mixture with water and agitating it with ether there is obtained Δ⁸-1β-(γ'-acetylpropyl)-2-oxymethyl-2-chloro-4bβ - methyl - 1,2,3,4,4aα,4b,5,6,7,-9,10,10aβ-dodecahydrophenanthrene-7-one. It exhibits in the ultraviolet absorption spectrum a maximum at 241 mμ (log ε=4.18). In the infra-red absorption spectrum it exhibits, in addition to bands at 1624 and 1676 cm.⁻¹ (α,β-unsaturated ketone) and at 1715, 1220 and 1170 cm.⁻¹ (methyl-ketone), the absorption of free hydroxyl at 3320 cm.⁻¹.

The same chlorhydrin can also be obtained by treating the oxide described above with hydrogen chloride in solution in absolute ether.

The corresponding bromhydrin can be prepared as follows:

500 milligrams of the oxide are dissolved in 10 cc. of glacial acetic acid and mixed with a solution of hydrogen bromide in glacial acetic acid, while cooling with ice and stirring well. The reaction mixture is slowly brought to 20° C., then introduced into ice cold water and the product is worked up by agitation with ether.

405 milligrams of $\Delta^8$-1$\beta$-($\gamma'$-acetylpropyl)-2-oxymethyl-2-chloro-4b$\beta$-methyl-1,2,3,4,4a$\alpha$,4b,5,6,7,9,10,10a$\beta$-dodecahydrophenanthrene-7-one are dissolved in 20 cc. of glacial acetic acid, diluted with 0.2 cc. of water, and then there are added dropwise 5 cc. of a solution of chromium trioxide in glacial acetic acid which contains 7 milligrams of active oxygen per cc. After allowing the reaction mixture to stand overnight at 22° C. it is mixed with a small amount of methanol, and then worked up by agitation with ether. For the purpose of after-oxidation the crude product so obtained is dissolved in 300 cc. of methanol and a solution of 2.74 grams of sodium hydroxide in 8 cc. of water is added at 0° C. There are then added 8.1 grams of silver nitrate in 10 cc. of water. After the solution has been vigorously agitated for 3 hours, the silver oxide is filtered off, the filtrate is concentrated to a far reaching extent in vacuo, and is finally free from neutral constituents by extraction with ether. By the addition of 2 N-sulphuric acid to the alkaline solution until it has an acid reaction to Congo and extracting the mixture with ether a total of 300 milligrams of acid constituents are isolated, which are esterified in ethereal solution with diazomethane. The methyl ester so obtained exhibits in the infra-red absorption spectrum the following bands: at 1623 cm.$^{-1}$, 1676 cm.$^{-1}$ ($\alpha,\beta$-unsaturated ketone), and at 1737 cm.$^{-1}$ a wide band (ester and methyl-ketone). The compound is $\Delta^8$-1$\beta$-($\gamma'$-acetylpropyl)-2-carbomethoxy-2-chloro-4b$\beta$-methyl-1,2,3,4,4a$\alpha$,4b,5,6,7,9,10,10a$\beta$-dodecahydrophenanthrene-7-one.

2.1 grams of the above compound are dissolved in 45 cc. of anhydrous methanol and 2.0 cc. of a 2 N-methanolic solution of sodium methylate are added. The reaction mixture is maintained overnight at 0° C. and is then heated for a further hour at 60° C. By stirring the solution into ice water, extracting the mixture with ether, and then subjecting it to chromatography over aluminium oxide there is obtained $\Delta^4$-3,20-dioxo-pregnene-18-acid methyl ester. The latter compound exhibits in the infra-red absorption spectrum bands at 1623 and 1676 cm.$^{-1}$ ($\alpha,\beta$-unsaturated ketone) and a broad absorption at 1737 cm.$^{-1}$ (ester and methyl-ketone). In the ultraviolet absorption spectrum it exhibits a maximum at 241 m$\mu$ (log $\epsilon$=4.24).

500 cc. of sterile beer wort are inoculated in an agitating vessel with Cunninghamella Blakesleena and the mixture is agitated for 3 days at 27° C. There is then added to the well developed culture under sterile conditions a solution of 150 milligrams of $\Delta^4$-3,20-dioxo-pregnene-18-acid methyl ester in 8 cc. of acetone. After 3 days the mycelium is removed and washed with water and ethyl acetate. The combined filtrates are extracted with ethyl acetate, and the ethyl acetate solution is evaporated, after being dried. The residue so obtained (165 milligrams) exhibits in the ultraviolet spectrum a maximum at 242 m$\mu$ (log $\epsilon$=424). In the infrared spectrum it exhibits, in addition to the bands at 1622 and 1676 cm.$^{-1}$ ($\alpha,\beta$-unsaturated ketone) and 1735 cm.$^{-1}$ (ester and

the absorption for free hydroxyl at 3320 cm.$^{-1}$. The compound is $\Delta^4$-3,20-dioxo-11$\beta$-oxypregnene-18-acid methyl ester.

312 milligrams of $\Delta^4$-3,20-dioxo-11$\beta$-oxy-pregnene-18-acid methyl ester are heated for 4 hours at the boil under nitrogen in 10 cc. of a butanolic solution of caustic potash of 18 percent strength. The reaction mixture is then poured on to ice, acidified with 2 N-sulphuric acid until it has an acid reaction to Congo, and is then extracted with methylene chloride. The crude product obtained by evaporating the methylene chloride solution is purified by filtration through aluminium oxide and sublimation in a high vacuum. The sublimate melts at 190–193° C. and is identical with the known (18→11)-lactone of $\Delta^4$-3,20-diketo-11$\beta$-oxy-pregnene-18-acid, and can be converted into aldosterone as described in Experienta, volume 11, page 363 (1955).

*Example 4*

105 grams of the lactam of $\Delta^{8a}$-1$\beta$-($\beta'$-carboxyethyl)-2$\alpha$-amino-2$\beta$,4b$\beta$-dimethyl-7,7-ethylenedioxy-1,2,3,4,4a$\alpha$,4b,5,6,7,8,10,10a$\beta$-dodecahydrophenanthrene are dissolved in a mixture of 2 liters of butanol and 200 cc. of water, and 400 grams of solid sodium hydroxide are added. After agitating well, the mixture is boiled under reflux for 5 hours, is poured after cooling on to 4 liters of ice-water, and the suspension is extracted continuously with ether.

The aqueous suspension is carefully adjusted to pH 10, while stirring well with concentrated hydrochloric acid, saturated with sodium chloride and, after being allowed to stand for some time, filtered. The so obtained sodium salt of the amino acid is dissolved in one litre of hot water, filtered off from any undissolved portions and the solution saturated with sodium chloride, the sodium salt of $\Delta^{8a}$-1$\beta$-($\beta'$-carboxyethyl)-2$\alpha$-amino-2$\beta$,4b$\beta$-dimethyl-7,7-ethylenedioxy-1,2,3,4,4a$\alpha$,4b,5,6,7,8,10,10a$\beta$-dodecahydrophenanthrene precipitating in the form of fine needles. The water adhering to the precipitate is separated off azeotropically with benzene by boiling for 12 hours on a water-separator. In addition to 82.3 grams of sodium salt of the amino acid, which after being recrystallized three times from methanol melts at 301–304° C., 1965 grams of unchanged starting material can be obtained from the ethereal extract.

35 grams of the sodium salt of $\Delta^{8a}$-1$\beta$-($\beta'$-carboxyethyl)-2$\alpha$-amino-2$\beta$,4b$\beta$-dimethyl-7,7-ethylenedioxy-1,2,3,4,4a$\alpha$,4b,5,6,7,8,10,10a$\beta$-dodecahydrophenanthrene melting at 301–304° C. are boiled under reflux for 2 days together with 400 cc. of absolute methanol, 450 grams of methyl iodide and 100 grams of anhydrous potassium carbonate, while mixing vigorously with a vibromixer. After 24 hours another 100 grams of methyl iodide are added. The unreacted methyl iodide is distilled off and the reaction mixture is filtered through cotton-wool and washed well with absolute methanol. The mixture is evaporated to dryness under reduced pressure. The residue is dissolved in 600 cc. of ethylene glycol and mixed with a solution of 150 grams of potassium hydroxide in 150 cc. of water. It is then heated first for one hour at 135° C. under nitrogen, a part of the water evolving together with trimethylamine. A reflux condenser is then attached to the top of the flask and a temperature of 175° C. maintained for 3½ hours. After being cooled, the reaction mixture is poured on to ice and any neutral portions are removed with methylene chloride. The aqueous, strongly alkaline solution is adjusted while stirring well with 5 N-phosphoric acid to a pH value of 6.5–7.0 and extracted with methylene chloride. From the well washed organic phase 23 grams of acid portions are obtained which after crystallization form a mixture of acetone and isopropyl ether yield 20.6 grams of $\Delta^{8a}$-1$\beta$-($\beta'$carboxyethyl)-2-methylene-4b$\beta$-methyl-7,7-ethylenedioxy-1,2,3,4,4a$\alpha$,4b,5,6,7,8,10,10a$\beta$-dodecahydrophenanthrene. The pure compound melts after recrystallization at 121° C. and has the specific rotation [$\alpha$]$_D^{20}$=—66° (c.=0.970 in chloroform). In the infra-red spectrum it exhibits bands at 896, 1647 cm.$^{-1}$ (>=CH$_2$) and at 1708 cm.$^{-1}$ (—COOH).

The acid obtained can be extended by one carbon atom as follows:

1.375 grams of $\Delta^{8a}$-1$\beta$-($\beta'$-carboxyethyl)-2-methylene-4b$\beta$-methyl-7,7-ethylenedioxy-1,2,3,4,4a$\alpha$,4b,5,6,7,8,10,10a$\beta$-dodecahydrophenanthrene are esterified in chloroform at 0° C. with diazomethane. The methyl ester is dissolved in 100 cc. of absolute ether and added dropwise to a suspension of 430 mg. of lithium aluminium hydride in 10 cc. of absolute ether. The mixture is then boiled under reflux for 2 hours. The excess reducing agent is carefully decomposed with ice-water. After adding 1 gram of diatomaceous earth, the reaction mixture is filtered and washed with chloroform. The organic phase is washed neutral with water, dried and evaporated. The crude product (1.272 grams) crystallizes from a mixture of ether and petroleum ether in the form of needles. After being recrystallized three times the pure $\Delta^{8a}$-1$\beta$-($\gamma'$-hydroxypropyl)-2-methylene-4b$\beta$-methyl-7,7 - ethylenedioxy-1,2,3,4,4a$\alpha$,4b,5,6,7,8,10,10a$\beta$-dodecahydrophenanthrene melts at 95° C. and has the specific rotation $[\alpha]_D = -70°$ (chloroform).

500 mg. of the hydroxy-compound melting at 95° C. are dissolved in 3 cc. of pyridine and mixed with 345 mg. of tosyl chloride at $-5°$ C. The reaction mixture is allowed to stand for 12 hours at 0° C. After adding 20 cc. of saturated sodium hydrogen carbonate solution, the mixture is stirred vigorously for 10 minutes at 0° C. and then extracted with ether. Crystallization of the extract from a mixture of benzene and petroleum ether yields 700 mg. of tosylate melting at 108° C. After being recrystallized three times, the pure compound melts at 115° C. It has the specific rotation $[\alpha]_D = -29°$ (chloroform). In the intra-red spectrum it exhibits bands at 902, 1647 cm.$^{-1}$ ($>C=CH_2$); 1180 and 1355 cm.$^{-1}$ sulphonate and at 815 cm.$^{-1}$ (1,4-disubstituted phenyl).

500 mg. of the tosylate are dissolved in 10 cc. of absolute ethanol and boiled together with 400 mg. of potassium cyanide for 5 hours under reflux. The potassium cyanide gradually dissolves, and at the same time potassium para-toluene sulphonate begins to separate. The cold reaction mixture is poured on to ice and extracted with chloroform. The $\Delta^{8a}$-1$\beta$-($\gamma'$-cyanopropyl)-2-methylene-7,7-ethylenedioxy-4b$\beta$-methyl - 1,2,3,4,4a$\beta$,4b,5,6,7, 8,10,10a$\beta$-dodecahydrophenanthrene (255 mg.) melts at 140° C. after being recrystallized three times from a mixture of ether and petroleum ether. It has the specific rotation $[\alpha]_D^{22} = -69°$ (chloroform). In the infra-red spectrum it exhibits bands at 901, 1647 cm.$^{-1}$ ($\gamma C=CH_2$) and at 2260 cm.$^{-1}$ (saturated alkyl nitrile).

The 1$\beta$-($\beta'$-carboxyethyl)-group can also be extended as follows:

6.03 grams of $\Delta^{8a}$-1$\beta$-($\beta'$-carboxyethyl)-2-methylene-4b$\beta$-methyl-7,7-ethylenedioxy - 1,2,3,4,4a$\alpha$,4b,5,6,7,8,10, 10a$\beta$-dodecahydrophenanthrene are dissolved in 50 cc. of methanol and neutralized with 17.2 cc. of 1 N-caustic soda solution. The solution is evaporated to dryness under reduced pressure and dried for 4 hours at 120° in high vacuum. The finely pulversized sodium salt is once more well dried, suspended in 150 cc. of absolute benzene, mixed with 3 cc. of pyridine and cooled to 0° C. 40 grams of oxalyl chloride are added dropwise in the course of 15 minutes while stirring and the reaction mixture is maintained for 1 hour at 0° C. The solvent is evaporated at room temperature under reduced pressure and the residue is dried by adding and evaporating benzene three times.

The acid chloride dissolved in 150 cc. of benzene is added at $-10°$ C. to 120 cc. of an ethereal solution of diazo methane of 3% strength and kept for 12 hours at $-20°$ C. The solution is evaporated at 10° C. under reduced pressure. The crude diazoketone is taken up in 400 cc. of benzene and filtered through 60 grams of aluminium oxide (activity III). The resulting diazoketone (5.7 grams) melts at 120–130° C. with decomposition.

Freshly precipitated silver oxide washed with water and absolute methanol is boiled in 200 cc. of absolute methanol until a silver mirror is formed. The diazoketone dissolved in 500 cc. of absolute methanol is added and the mixture is boiled under reflux for 3 hours with stirring. About 1 gram of active carbon is then added to the hot solution and the whole is filtered after cooling through diatomaceous earth. The resulting crude ester is hydrolysed with 200 cc. of methanolic caustic potash solution of 3% strength by heating at 60° C. for ¾ hour. After extracting the neutral portions, the aqueous solution is adjusted with 5 N-phosphoric acid to a pH value of 6.5–6.8 and extracted with methylene chloride. By recrystallization from acetone and isopropyl ether there are obtained 3.2 grams of $\Delta^{8a}$-1$\beta$-($\gamma'$-carboxypropyl)-2-methylene-4b$\beta$-methyl-7,7-ethylenedioxy - 1,2,3,4, 4a$\alpha$,4b,5,6,7,8,10,10a$\beta$-dodecahydrophenanthrene melting at 145° C. After being recrystallized once more, the pure compound melts at 147° C.

The resulting acid can be built up into the corresponding methyl ketone as follows:

81 mg. of lithium methyl in 4.9 cc. of ether are added dropwise with stirring to a solution of 550 mg. of $\Delta^{8a}$-1$\beta$-($\gamma'$-carboxy-propyl)-2-methylene-4b$\beta$-methyl-7,7 - ethylenedioxy -1,2,3,4,4a$\alpha$,4b,5,6,7,8,10,10$\beta$-dodecahydrophenanthrene in 60 cc. of absolute ether. The mixture is stirred for 3 hours at room temperature. The milky mixture is poured on to ice and extracted with ether. From the ethereal layer 329 mg. of crystalline material are isolated which are chromatographed over aluminium oxide (activity III). With benzene-petroleum ether (4:1) 250 mg. of pure $\Delta^{8a}$-1$\beta$-($\delta'$-oxo-amyl)-2-methylene-4b$\beta$-methyl-7,7-ethylenedioxy - 1,2,3,4,4a$\alpha$,4b,5,6,7,8,10,10a$\beta$-dodecahydrophenanthrene melting at 152° C. are obtained. It has the specific rotation $[\alpha]_D^{22} = -66°$ (chloroform). In the infrared spectrum it exhibits bands at 892, 1646 cm.$^{-1}$ ($>=CH_2$) and at 1710 cm.$^{-1}$ (methyl ketone). The benzene and benzene-ether (1:1) fractions yield 71 mg. of the corresponding carbinol melting at 120° C.

From the aqueous alkaline solution 200 mg. of starting material can be recovered in the customary manner.

The lactam of $\Delta^{8a}$-1$\beta$-($\beta'$-carboxyethyl)-2$\alpha$-amino-2$\beta$, 4b$\beta$-dimethyl-7,7-ethylenedioxy - 1,2,3,4,4a$\alpha$,4b,5,6,7,8,10, 10a$\beta$-dodecahydrophenanthrene used as starting material in the above example can be prepared as follows:

100 grams of lactam of $\Delta^{8a}$-1$\beta$-($\beta'$-carboxy-ethyl)-2$\alpha$-amino - 2$\beta$,4b$\beta$ - dimethyl - 1,2,3,4,4a$\alpha$,4b,5,6,7,8,10,10a$\beta$-dodecahydrophenanthrene-7$\beta$-ol are dissolved together with 7.5 grams of anhydrous sodium acetate in 1.66 litres of glacial acetic acid. A solution of 52.9 grams of bromine (1 equivalent) in 750 cc. of glacial acetic acid are added dropwise in the course of 30 minutes at 10–15° C. with vigorous stirring. 33.1 grams of chromium trioxide dissolved in 400 cc. of acetic acid of 90% strength are then added to the faintly yellow solution, and the whole is allowed to stand for 12 hours at room temperature after being well agitated. Any excess chromic acid is decomposed with 100 cc. of methanol. After one hour, the mixture is mixed with 309 grams of zinc dust at 90° C. with vigorous agitation (vibromixer) and maintained at that temperature for 30 minutes. The still warm reaction mixture is filtered and the zinc dust is washed with ample methylene chloride. The filtrate is diluted with 6 litres of water and extracted repeatedly with methylene chloride, which is washed in succession with 2 N-hydrochloric acid, ice-cold 2 N-caustic soda solution and water. The crystalline residue of the organic phase is dissolved in 700 cc. of hot methanol and decolorized with active carbon. After the addition of 700 cc. of hot ethyl acetate the mixture is evaporated until crystallization sets in. The lactam of $\Delta^{8}$-1$\beta$-($\beta'$-carboxy - ethyl) - 2$\alpha$ - amino - 2$\beta$,4b$\beta$ - dimethyl - 1,2,3,4 - 4a$\alpha$,4b,5,6,7,9,10,10a$\beta$ - dodecahydrophenanthrene - 7 - one (88.1 grams) melts at 260–261° C. From the mother liquors a further 5.9 grams of the lactam can be isolated. After being recrystallized three times from a mixture of methanol and ethyl acetate the pure compound melts at 265–266° C. It has the specific rotation $[\alpha]_D^{22} = 84.5°$ (chloroform). Ultraviolet spectrum: max.$\lambda = 239$ m$\mu$(log $\epsilon = 4.19$).

14.1 grams of the lactam of $\Delta^{8}$-1$\beta$-($\beta'$-carboxyethyl)-2$\alpha$ - amino - 2$\beta$,4b$\beta$ - dimethyl - 1,2,3,4,4a$\alpha$,4b,5,6,7,9,10, 10aβ,-dodecahydrophenanthrene-7-one are dissolved in a mixture of 450 cc. of absolute benzene, 20 cc. of ethylene glycol and 450 mg. of para-toluene sulphonic acid and boiled under reflux for 60 hours, the azeotropically distilled water being caught in a water-separator. Half of the benzene is evaporated under reduced pressure, the mixture is poured on to ice-cold 2 N-caustic soda solution and extracted with ample methylene chloride. The organic layer washed with 2 N-caustic soda solution and water is evaporated until crystallization sets in. The crystallized lactam of Δ$^{8a}$-1β-(β'-carboxyethyl)-2α-amino-2β,4bβ- dimethyl-7,7-ethylenedioxy-1,2,3,4,4aα,4b,5,6,7,8,10,10aβ-dodecahydrophenanthrene (12.8 grams) melts at 309–311° C. It has the specific rotation $[\alpha]_D^{22} = -58.5°$ (chloroform).

What is claimed is:

1. A member selected from the group consisting of compounds of the formulae

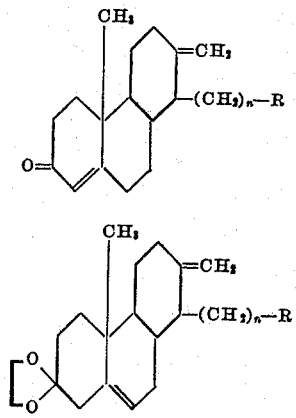

and wherein R is a member selected from the group consisting of carboxyl, lower-alkanol-esterified carboxyl, cyano and acetyl, and n is a whole number from 2 to 3.

2. The compound of the formula

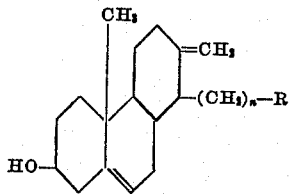

3. The compound of the formula

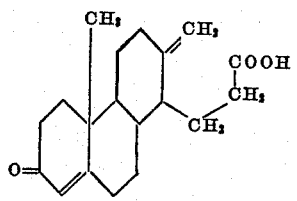

4. The compound of the formula

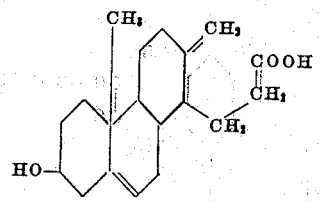

5. The compound of the formula

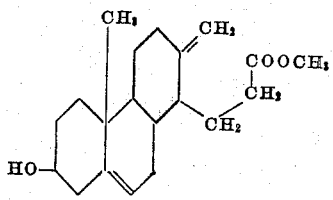

6. The compound of the formula

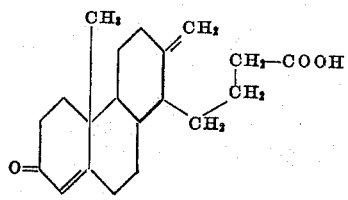

7. The compound of the formula

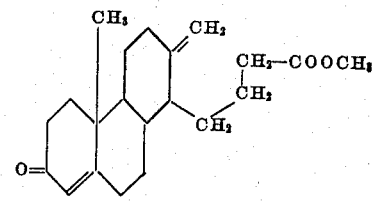

8. The compound of the formula

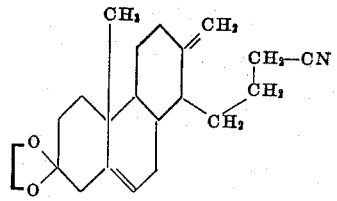

9. The compound of the formula

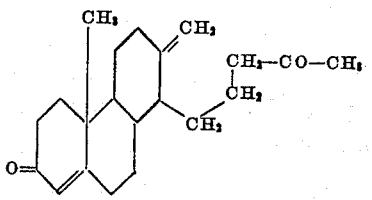

10. The compound of the formula

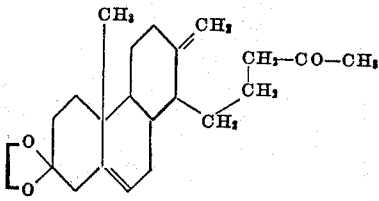

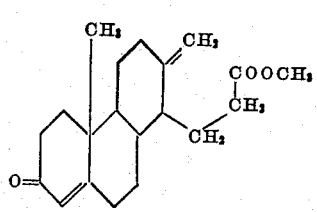

11. The compound of the formula
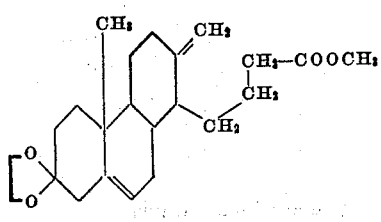
12. The compound of the formula
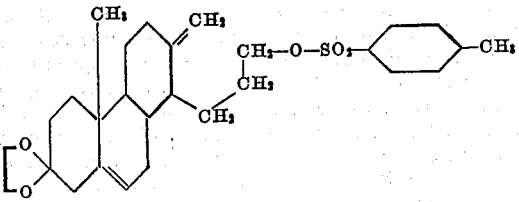
References Cited in the file of this patent
UNITED STATES PATENTS
2,689,856   Miescher et al. ---------- Sept. 21, 1954